Nov. 26, 1929.  F. N. WOODWARD  1,737,181
METHOD AND MEANS FOR REPAIRING LEAKS IN PIPE LINES
Filed March 24, 1927  2 Sheets-Sheet 1
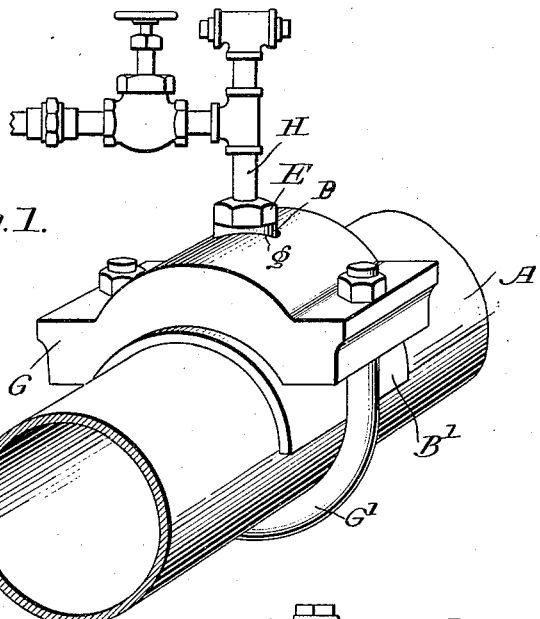
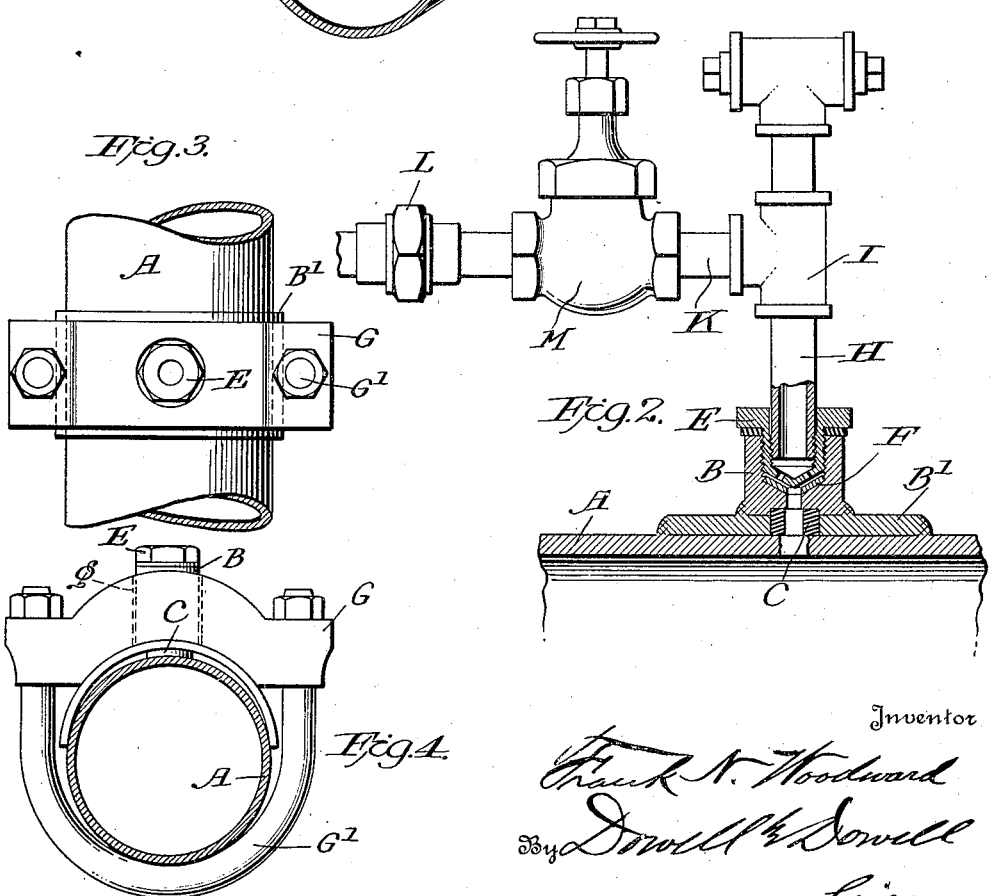
Inventor
Frank N. Woodward
By Dowell & Dowell
his Attorneys

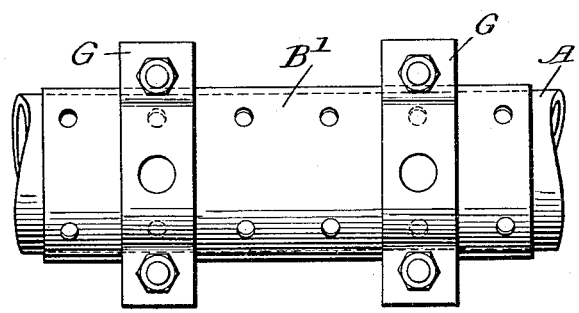
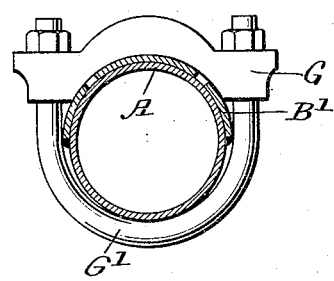
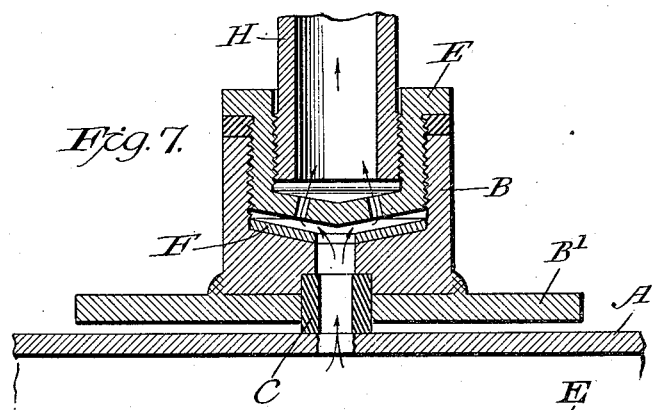
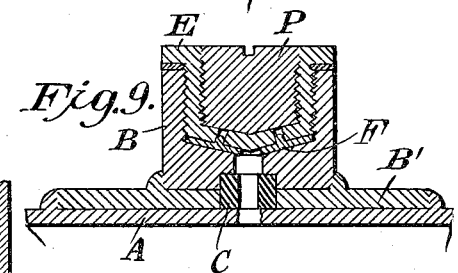
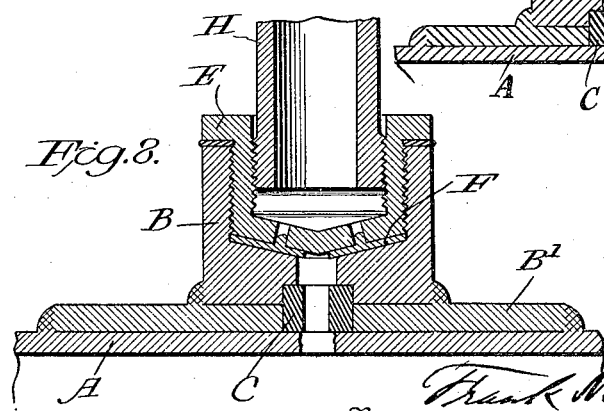

Patented Nov. 26, 1929

1,737,181

UNITED STATES PATENT OFFICE

FRANK N. WOODWARD, OF COAL CITY, INDIANA

METHOD AND MEANS FOR REPAIRING LEAKS IN PIPE LINES

Application filed March 24, 1927. Serial No. 178,101.

This invention relates to means for repairing leaks in pipes, and more particularly to means for repairing leaks in oil pipe lines and salvaging the pipe.

Holes in pipe lines are caused mostly from electrolysis. They are seldom larger than a nickel, but go through the walls of the pipe, and at the bottom they are often not larger than a match, usually smaller, and repair as now made is secured by replacing the affected section of pipe. Replacement however is very expensive, as it entails the loss of use of the line while replacement is being effected, and while the cost of replacement in itself is a comparatively small item, the loss of the use of the line, where the line is carrying several hundred barrels of oil each hour, is considerable. The shutting down of pumps at one location for pipe replacement usually ties up an entire pipe line system, as pipe lines are designed for continuous service, and the work incident to replacement is quite expensive. A leak in a pipe line is comparable quite often to a railroad wreck, inasmuch as a wreck ties up a railroad, and a leak in a pipe line ties up the line.

The principal objects of my invention are to provide simple and efficient means for repairing leaks in an oil pipe line while under normal load or pressure and salvaging the defective pipe, so that the earnings of the pipe line may be continued while repairs are being made, thereby effecting considerable saving in the cost of maintenance and removal of pipes that have become damaged by soil conditions, electrolysis, erosion or corrosion, and reducing the cost of pipe line maintenance to a minimum.

Other objects will appear from the following description.

The invention will first be hereinafter more particularly described, with reference to the accompanying drawings, which are to be taken as a part of this specification, and then pointed out in the claims at the end of the description.

In said drawings, Fig. 1 is a perspective view of my improved pipe-line repair outfit showing the several parts in assembled relation upon a pipe in which a leak is to be stopped;

Fig. 2 is a side elevation of said outfit partly in section illustrating its application to a defective pipe;

Fig. 3 is a plan view of the clamping device forming a part of said outfit, illustrating the mode of applying a leak patch and lagging to a defective pipe; the means for connecting said device with a drainage pipeline for drawing off fluid from the pipe during the leak-repairing operation being removed;

Fig. 4 is a side view of the clamping device shown in Fig. 3, showing the pipe in cross-section;

Fig. 5 is a plan view of a form of leak patch with lagging of considerable length applied to a defective pipe in which there are two or more leaks to be repaired;

Fig. 6 is a side view of the clamping device shown in Fig. 5, showing the pipe in cross-section;

Fig. 7 is a fragmentary vertical sectional view illustrating the application of the leak patch with shut-off valve to a hole in the pipe; the valve being open;

Fig. 8 is a vertical sectional view, similar to Fig. 7, showing the shut-off valve closed; and Fig. 9 is a view similar to Fig. 8 wherein a permanent closure plug is shown substituted for a temporary drain connection.

Referring to said drawings, in which the same reference letters are used to denote corresponding parts in different views, the letter A denotes a portion of a pipe in an oil or other pipe-line in which there is a hole or holes through which liquid may escape, and B, B¹, denote a leak patch for closing said hole or holes in the pipe line in the manner hereinafter described. The leak patch comprises a shut-off valve B mounted preferably by arc welding on a section of iron or steel plate B¹, formed to fit approximately one-half the outer circumference of a pipe in the pipe-line to be repaired, and may be of such length as the condition of the pipe or other considerations dictate. The purpose of the shut-off valve is to properly and safely control the flow of oil or other fluid from a leak or leaks in a pipe-line while a patch over the leak or leaks is being welded to the pipe. The leak patch may be of any desired length so as to cover either a single hole or fissure or two or more holes. The iron or steel plate shown in Fig. 1 is of the size used to repair a single hole, while the form shown in Fig. 5 is adapted for use in repairing two or more leaks in the same pipe. The plate B¹ has an opening therethrough in which is fitted a compressible body C, of rubber or other suitable material, having a hole therethrough adapted to register with a hole in the pipe which is to be closed without interfering with the normal flow of oil or other liquid through the pipe. Preferably the compressible body protrudes through the opening in the plate into a recess formed in the lower end of the valve body which has an interiorly threaded socket in the upper part thereof into which is screwed a valve bushing E, of tubular form, having its lower end closed, except for one or more small holes for the passage of liquid therethrough; said closed end being adapted to fit upon a valve seat provided therefor within the valve body, and upon said seat is placed a gasket F of lead or other malleable metal having an opening therethrough which overlies and registers with the opening in the valve body which is arranged in alinement with the openings in the compressible body and underlying pipe. The iron or steel plate is adapted to be firmly secured upon the pipe by means of a suitable clamping device or devices, accordingly as it is desired to repair one or more leaks. In the form shown in Fig. 1 a single clamp is used, forming a part of the repair outfit. But when there are two or more leaks to be repaired, two or more clamps are used. The clamp consists of a bow-shaped cross-bar G and a U-shaped bolt G¹ having threaded ends which are passed through apertures in the cross-bar and secured thereto by nuts screwed on the threaded ends of the bolt so as to firmly clamp the pipe and leak patch or lagging between the bolt and cross-bar. The cross-bar has an opening $g$ therein through which the valve body and bushing protrude, as shown in Fig. 1, when the clamp is applied to the pipe, and thereupon a nipple H of a drainage pipe connection is inserted in the valve bushing so as to establish a fluid-passage-connection between the oil pipe-line and a drainage pipe. Said connection comprises a pipe section, one end of which is connected with a T-coupling I, by means of a nipple K, while the other end carries a pipe coupling L for connection with one end of a pipe in a drainage pipe-line. The T-coupling I which connects nipple H with valve bushing E provides a connection for a pressure gauge, if it is desired to take the pressure at points where repairs are being made, but such connection may be omitted and another type of coupling used in place of the T-coupling. The pipe section carrying the pipe coupling L is provided with a globe or other valve M for controlling the passage of liquid through said pipe section; said valve being of any suitable construction and having means for opening and closing the same in a well known manner.

The patch shown in Fig. 5 has numerous holes therein and is secured against the pipe by two clamps for welding the patch to the pipe. In electric arc welding such welds would be called "rivet welds", but I prefer to call them anchor welds, hence the term "anchored lagging", as welding the patch to pipe through these holes reinforces the edge weld, giving greater strength if conditions should required it.

In operation, the valve body being welded to and carried by the metal plate which is to be secured to the pipe, the assembly shown in Figs. 1 and 2, with the parts in the position shown in Fig. 7, and the valve body welded to the metal plate, as shown, is applied to the pipe having a hole therein to be repaired by arranging the valve body overlying the compressible body with the valve opening in alinement with the hole in said body while the hole through the latter is in alinement with a hole in the pipe, so as to permit the passage of oil or other liquid from the pipe through the opening in the patch, which is shown raised slightly above the pipe. The bolts which secure the patch upon the pipe are tightened, thereby compressing the rubber gasket or body C and diverting oil or other fluid into the valve chamber, and the valve M being open the liquid within the pipe will flow therefrom through the hole in the compressible body into the valve chamber and thence through the nipples H and K and the pipe section which is connected by the coupling L with the drainage pipe. Thereupon the metal plate B¹ is firmly welded to the pipe A, preferably by the well known process of electric arc welding, and the valve bushing E is then screwed down upon the lead gasket F so as to compress the same and close the shut-off valve and at the same time squeeze some of the lead into the holes in the closed end of the valve bushing and close the holes therein, whereupon the fluid-passage-connection between the shut-off valve and the drainage pipe-line is removed by disconnecting the pipe coupling L and withdrawing the nipple H from the valve bushing E. A metal stopper plug P is then screwed into said bushing E and permanently secured therewithin by welding or otherwise, so as to permanently close the bushing over the hole or leak in the pipe-line and thereby stop further leakage.

The compressible body or gasket C is of sufficient thickness to make compression possible and being compressed between the pipe and shut-off valve will prevent any oil or fluid from escaping between the pipe and patch, thus making it possible to weld the patch to the pipe safely, and without being bothered with the escape of oil or fluid during the welding operation.

In repairing two or more leaks in close proximity in the same pipe, lagging of sufficient length, as shown in Fig. 5, is used, having numerous holes therein for the purpose of anchor-welding the plate to the pipe, as hereinbefore described, after it has been welded thereto along its edges, as shown.

Having thus described my invention, what I claim as new and desire to secure by Letters Patent of the United States is:

1. As a means for repairing leaks in a pipeline and salvaging defective pipe, a patch comprising a metal plate conforming to the shape of the pipe and having an opening therein in which is fitted a compressible body having a hole therethrough and a shut-off valve mounted on the plate with an inlet to the valve chamber arranged over the hole in said body; said plate being adapted to be welded to the pipe overlying the leak, means for clamping said metal plate against the pipe, and means for establishing a fluid-passage-connection between said compressible body and a drainage pipe; the latter means consisting of a valve-controlled pipe-section provided with means for connecting one end thereof with the drainage pipe, the other end being provided with a nipple adapted to be removably inserted in the valve chamber, and means within the valve chamber whereby the valve may be closed after the nipple is removed.

2. As a means for repairing leaks in a pipe line, a metal plate having an opening therein in which is fitted an apertured compressible body and having mounted thereon a valve chamber with an inlet thereto arranged over the aperture in said body; said plate being adapted to be applied to a pipe with the opening in said body in alinement with a hole in the pipe and to be welded to the pipe, a valve bushing of tubular form screwed into said valve chamber and having its lower end closed and provided with an exit port for the passage of liquid therethrough, and means for establishing a fluid-passage-connection between said compressible body and a drainage pipe line; the latter means comprising a pipe-section having a valve therein for controlling the passage of liquid therethrough and provided with means for connecting one end thereof with the drainage pipe and a nipple at the other end adapted to be removably inserted in said valve bushing.

3. Means for repairing a leak in a pipe line, comprising a metal plate conforming to the shape of the pipe and adapted to be welded thereto; said plate having an opening therein in which is fitted a compressible body having a hole therethrough and a valve chamber mounted on the plate with an inlet thereto overlying the hole in said body; said valve chamber having a detachable bushing screwed therein and a soft metal gasket overlying said inlet; the inner end of said bushing being closed and provided with an outlet port, and means for discharging fluid from within said pipe through said valve chamber; said means comprising a pipe-section with a control valve therein and means for connecting it with a drainage pipe; the latter means including a nipple adapted to be removably inserted in said bushing.

4. In a device of the character described, a patch consisting of a metal plate conforming to the shape of a pipe to be repaired and adapted to be welded to the pipe; said plate having an opening therein in which is fitted a compressible body with a hole therein adapted to overlie a hole in the pipe and a valve chamber mounted on the plate with an inlet thereto arranged over the hole in said compressible body; said valve chamber being interiorly threaded and having a bushing of tubular form screwed therein; said bushing having its lower end closed but apertured for the passage of liquid therethrough, detachable means for connecting said bushing with a drainage pipe, and a soft metal gasket interposed between a valve seat in said valve chamber and the closed end of said bushing, whereby the opening through the valve chamber may be closed by compression of the soft metal within the chamber when the bushing is screwed into said chamber.

5. Means for repairing leaks in a pipe-line and salvaging defective pipe; said means comprising a metal plate conforming to the shape of the pipe and having an opening therein in which is fitted a compressible body having a hole therethrough and a valve body mounted on the plate having a valve chamber in the upper part thereof with the inlet thereto arranged over the hole in said body, said plate being adapted to be welded to the pipe overlying the leak, a bushing of tubular form screwed into said valve chamber having its lower end closed and apertured for the passage of liquid therethrough, means for clamping said plate against the pipe, and means for establishing a fluid-passage-connection between said compressible body and a drainage pipe; the latter means comprising a pipe-section having a controlling valve therein and a pipe coupling at one end for connection with the drainage pipe, and a coupling member at the other end thereof provided with a nipple adapted to be removably inserted in the valve chamber, and means within said chamber whereby after the nipple is removed the valve may be closed by screwing said bushing in said chamber.

6. Means for repairing leaks in a pipe-line and salvaging defective pipe, comprising a metal plate conforming to the shape of the pipe and adapted to be welded thereto; said plate having an opening therein in which is secured a compressible body protruding above the plate and having a hole therethrough underlying a valve chamber of a shut-off valve mounted on the plate; means for clamping said plate firmly against the pipe with the hole in said body arranged over a hole in the pipe; said means serving to compress said body against the pipe so as to seal the joint around the hole therein and direct escaping liquid from said pipe into said valve chamber, removable means for establishing a fluid-passage-connection between said valve and a drainage pipe-line, and means within said chamber for closing the valve and cutting off the flow of liquid through said fluid-passage-connection so as to permit the latter to be removed so that a metal plug may be inserted and secured in the valve chamber to permanently close the hole in the pipe and stop the leak.

7. The method of repairing leaks in a pipeline, which consists in clamping upon the pipe a metal plate having a hole and nipple portion arranged over a hole in the pipe, sealing the joint around the hole in the pipe so as to direct escaping liquid within the pipe through said hole and nipple portion of the plate for drainage purposes, then welding the metal plate to the pipe, then cutting off the flow of liquid through said nipple portion, and then plugging the nipple portion over the hole and welding the plug in place.

8. Means for repairing leaks in a pipe-line and salvaging the pipe, comprising an apertured metal plate of concavo-convex form, a compressible body of tubular form filling the aperture in said plate, a valve body mounted on said plate and having an interiorly threaded socket in the upper part thereof, a metal bushing screwed into said socket having an interiorly threaded socket in its upper end and having its lower end closed but apertured, a malleable gasket seated in said valve body under said bushing, and a drainage pipe having an exteriorly threaded nipple at one end adapted to be screwed into said bushing and means for connecting the other end thereof with a drainage pipe line; whereby the fluid passage through said valve body may be closed by screwing said bushing so as to compress said gasket, thereby closing the fluid passage through the drainage pipe; said drainage pipe having a valve therein for controlling the passage of the liquid therethrough.

9. The herein described method of repairing a leak in a pipe-line, which consists in clamping upon the pipe a metal plate conforming to the shape of the pipe and carrying a tubular projection registering with a hole through the plate arranged over the leak in the pipe so as to force escaping liquid through said projection for drainage purposes, welding the metal plate to the pipe, then compressing a body of soft metal within the tubular projection to primarily close the passage therethrough over the hole in the pipe, and thereafter applying a secondary closure to said projection and permanently welding said closure in place.

In testimony whereof I affix my signature.

FRANK N. WOODWARD.